April 7, 1959  W. A. FRASER  2,880,650
OPTICAL GLASS DOMES
Filed Feb. 18, 1954
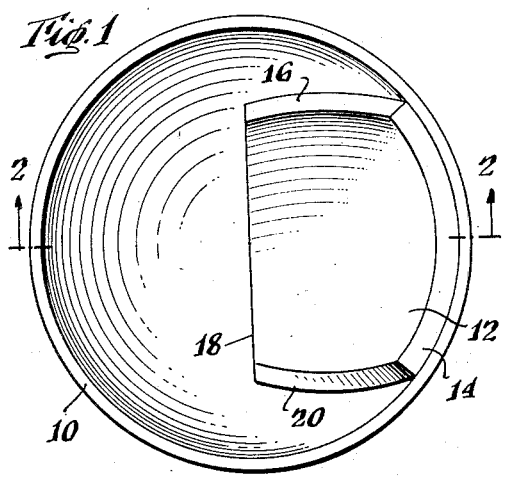
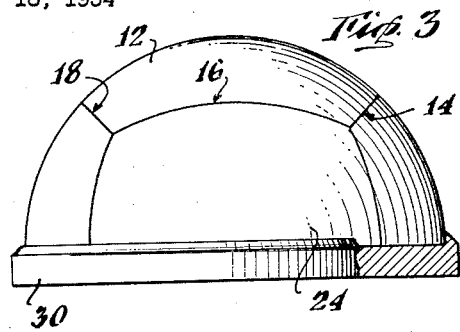
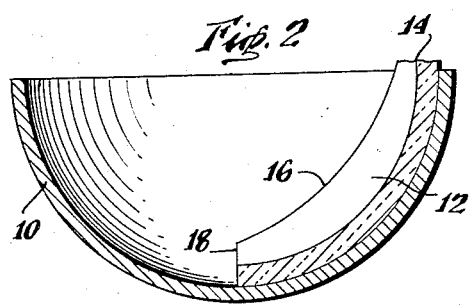
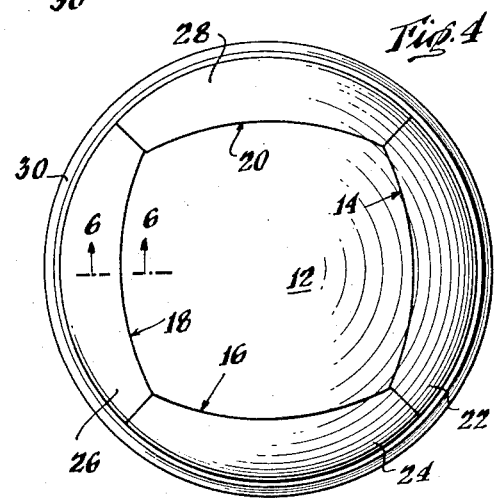
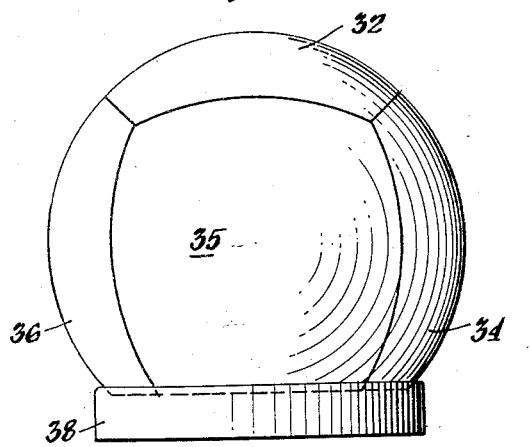
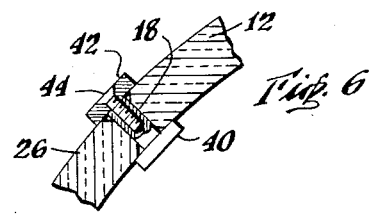
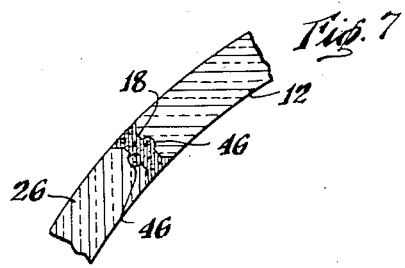
INVENTOR
Walter A. Fraser
BY
Eyre, Mann & Burrows
ATTORNEYS

United States Patent Office 2,880,650
Patented Apr. 7, 1959

2,880,650

OPTICAL GLASS DOMES

Walter A. Fraser, Roslyn Heights, N.Y.

Application February 18, 1954, Serial No. 411,072

5 Claims. (Cl. 88—59)

This invention relates to a dome intended to be made of a specialized type of glass, and methods of making such dome.

The main objects of this invention are to provide an improved optical glass dome or enclosure for equipment or devices designed to scan or receive predetermined light radiation of an invisible or substantially invisible frequency which are transmitted selectively by the particular glass employed; to provide a spherical form of enclosure of this kind which will have 180° or more of angular field from which light rays can be received through the enclosure by appropriate scanning or receiving means located at the center of curvature of the enclosure; to provide such an enclosure made of special glasses that cannot be blown or molded to form a single piece dome structure; to provide an improved segmental assembly for spherical shaped domes of this kind wherein there would be a minimum of obstruction of the incoming light rays by the segment joints; and to provide such an enclosure which can be made in larger sizes than heretofore possible with the special optical glass materials required.

Today, various types of materials are known which are correctly termed "glasses" but which transmit only those light rays which fall in quite a limited band. The type for which this invention has been developed (though it can be used with other types of glass if desired) includes the various glasses which primarily transmit infra red rays and which transmit little, or in extreme cases, none of the visible rays. A glass of this type may be made, for example, of arsenic sulphide. This particular glass is named only to indicate the general type of glass with which I am working, as many different formulas are known for making glasses of this general category.

While these products are true glasses and have many of the physical qualities of the siliceous materials to which the term "glass" is usually applied, nevertheless, they are sufficiently different so that certain of the techniques for handling and shaping silica glass do not apply. Specifically, forming these glasses by the customary blowing methods offers many difficulties. However, these special glasses are thermoplastic and in general they may be shaped while in the plastic state at temperatures somewhat below their melting point. Usually they are used as comparatively thick sheets.

This invention relates to methods of making domes of such glass (or other glasses if desired) where the dome involves arcs of approximately 180° or even more.

When making such a dome according to the present invention, a sheet of glass is brought up to its softening point and then pressed (or allowed to sink under the force of gravity) into a mold or shell of the desired spherical curvature. By this method I have succeeded in making pieces of special glass having a maximum arc ranging up to about 135° but that is approximately the maximum. To produce the dome of my invention, such a piece of glass is placed in a shell of the same curvature as that in which it was formed (the same shell may be used) which has at least part of its rim formed as a great circle of the sphere. The simplest embodiment of such a shell is to form it as an exact hemisphere, for in that case all of its rim is a great circle. The piece of glass is positioned in the shell so that part of one edge protrudes slightly above the great circle rim and then this edge is ground down so that all parts of such edge lie in the great circle plane. When this grinding is completed, the piece is moved so that another edge is brought up slightly above the rim and this is ground in a similar manner until all sides of the piece are formed to great circle planes.

The number of sides thus formed on the piece is theoretically unimportant as is the length of each side. However, it greatly simplifies the assembly of the dome if the sides are of the same length, and the fewer the sides, the smaller the number of pieces needed to complete the dome and the smaller the number of joints to interfere with the transmission of light.

In laying out the dome, it will ordinarily be advisable to have the principal piece used as the apex, and for this purpose a preferred shape is one having four equal sides and covering an arc of 90° on a plane passing through the center of curvature and bisecting two opposite sides of the piece. This is, of course, the minimum arc of the piece, whereas the maximum arc is the arc of intersection of the piece with the plane that passes diagonally through the corners. According to my experience it is not worth while to make the apex piece with a minimum arc of less than 60° and it is not readily feasible to make a piece larger than one having a minimum arc of more than about 120° (which on a four-sided figure would mean that its maximum arc would be in the neighborhood of 133°).

While the apex piece would preferably have sides of equal length and while I prefer to have only four sides, this number may be increased somewhat, though ordinarily the number should not exceed six. Thus if a four-sided apex is used, with a minimum arc of 90°, four other pieces will be needed to complete a hemisphere and each of these will be exactly half of the apex piece (divided by the plane on which the minimum arc is measured). If four pieces, each one similar to a full sized apex piece are used, a dome can be formed covering a total arc of approximately 270°. With other shapes and sizes of apex piece the shapes and sizes of the remaining pieces can readily be laid out and these will readily fit together if made of the right size and if each meeting line of two pieces of the glass is formed on a great circle plane.

This invention may be readily understood by reference to the accompanying drawings, in which Fig. 1 is a plan view of a hemispherical shell in which a piece of special glass is positioned for grinding;

Fig. 2 is a sectional view on line 2—2 of Fig. 1;

Fig. 3 is a side view of a dome made up using as its apex piece a piece of glass of the shape being prepared in Figs. 1 and 2;

Fig. 4 is a plan view of the dome of Fig. 3;

Fig. 5 is a side view of a dome having an arc of 270°;

Fig. 6 is a section on line 6—6 of Fig. 4 showing a manner in which the edges of the glass may be joined, and Fig. 7 is a similar sectional view showing an alternative method of doing the same thing.

Referring to Figs. 1 and 2, 10 is a hemispherical shell which may be formed of any desirable type of metal such as steel. A piece of glass 12 is softened with heat and then pressed in the shell 10 to assume the proper curvature. This piece is then moved in the shell until a portion of one side projects above the shell as indicated at 14 in Fig. 2. Its edge 14 is then ground down until it exactly coincides with the plane of the upper rim of the shell 10. This means that the edge will be ground in a plane whose intersection with the piece of glass forms a great circle. In Figs. 1 and 2 it is to be understood that the edges 16, 18 and 20 have already been ground in the manner described so that when the edge 14 is ground down, the piece 12 will cover an arc of 90° on a plane which passes through the center of curvature and bisects two opposite sides of the piece. This is the plane on which the section 2—2 is taken and the sectioned edge of the piece of glass shown in Fig. 2 clearly will have an arc of exactly 90° when edge 14 is fully ground down. This piece will be a perfectly symmetrical four-sided piece of glass.

In Fig. 3, the piece of glass 12 fully ground is used as the apex piece in a dome. Here edge 16 is at the front of the figure, edge 14 is toward the right and edge 18 is toward the left. Edge 20 shows only in Fig. 1; not in Fig. 3.

Apex piece 12 is surrounded by four other pieces 22, 24, 26 and 28. It is to be understood that each of these pieces is exactly one-half of the apex piece 12. In other words, each of these pieces is of exactly the shape of the portions of piece 12 shown in Fig. 2 where the piece 12 is cut in half by the section line.

It will be noted that each of the edges of pieces 22, 24, 26 and 28 also follows a plane which forms a great circle at its line of intersection with the curvature of the pieces.

In Figs. 3 and 4 the base of the dome or its mount is designated by the numeral 30.

In Fig. 5 I show a dome covering an arc of approximately 270°. In this figure the dome is made up of five pieces, all substantially alike. The apex piece 32 is exactly like the apex piece 12 of Figs. 3 and 4. There are four surrounding pieces, of which only three show in Fig. 5. These are designated by the numerals 34, 35 and 36. These pieces are similar in shape to the apex piece 32 and are all ground so that the edges which meet lie in planes which define great circles with the curvature of the piece. However, the edges which contact the base 38 are ground to lie in the plane of the base. A plan view of the dome of Fig. 5 would be exactly identical with Fig. 4 except that the base would not show.

Since this invention relates solely to the dome itself and the method of making same, no details for the base are shown and the details of construction will vary depending on the use to which the dome is to be put.

In Figs. 6 and 7 I show two methods whereby the pieces of glass may be connected. In each of these methods the connection takes up a smaller amount of space and therefore the glass sheets should be ground to an angular size slightly smaller than that indicated in the previous description.

In Fig. 6 a T-shaped member 40 is interposed between edge 18 of sheet 12 and the meeting edge of sheet 26. Outside plate 42 is attached to the leg of member 40 as by screws 44.

In Fig. 7 the corners of meeting sheets are ground off and grooves 46 are ground in the respective edges of the sheet. Cement or solder of types now available for connecting pieces of glass is then put between the edges and allowed to harden in place.

It is to be understood that the examples shown are given only by way of illustration and may be modified in many particulars and further, by way of illustration only, I may state that the domes to which this invention relates will ordinarily range up to a diameter of about 18 inches and the glass will normally have a thickness of between ¼-inch and ½-inch but can be thicker or thinner. There is no reason, however, why the invention should not be used for domes of any size for which the glass can be produced and shaped.

What I claim is:

1. An optical glass dome comprising, an apex piece of spherical polygonal configuration, and elements complemental to and supporting said apex piece, said complemental elements being arranged to substantially complete a hemisphere.

2. An optical glass dome comprising, an apex piece of spherical polygonal configuration having at least four equal sides, complemental apex supporting elements arranged to substantially complete a hemisphere, and including a base arranged to support said apex and said complemental supporting elements.

3. An optical glass dome comprising, an apex piece of spherical polygonal configuration, complemental apex supporting elements arranged to complete a partial sphere of substantially 270 degrees, and including a base arranged to support said apex and said complemental supporting elements.

4. A claim as in claim 1, wherein the edges of said complemental elements remote from said apex piece are ground to a horizontal plane.

5. A claim as in claim 1, wherein the abutting edges of the apex and supporting elements are ground so that said apex and said elements generate a true spherical surface.

References Cited in the file of this patent

UNITED STATES PATENTS

| | | |
|---|---|---|
| 578,620 | Barker | Mar. 9, 1897 |
| 591,466 | Gathmann | Oct. 12, 1897 |
| 896,631 | Dixon | Aug. 18, 1908 |
| 925,824 | Mygatt | June 22, 1909 |
| 1,504,970 | Pascucci | Aug. 12, 1924 |
| 1,952,237 | Ylla-Conte | Mar. 27, 1934 |
| 2,610,593 | Wasserman | Sept. 16, 1952 |
| 2,703,060 | Kiefer | Mar. 1, 1955 |
| 2,705,349 | Shaw | Apr. 5, 1955 |